US007258727B2

(12) United States Patent
Greif et al.

(10) Patent No.: US 7,258,727 B2
(45) Date of Patent: Aug. 21, 2007

(54) APPARATUS FOR SEPARATING PARTICLES FROM A FLOWING MEDIUM

(75) Inventors: Volker Greif, Harthausen (DE); Jens Haehn, Heidelberg (DE)

(73) Assignee: Mann & Hummel GmbH, Ludwigsburg (DE)

( * ) Notice: Subject to any disclaimer, the term of this patent is extended or adjusted under 35 U.S.C. 154(b) by 355 days.

(21) Appl. No.: 10/927,421

(22) Filed: Aug. 27, 2004

(65) Prior Publication Data

US 2005/0086915 A1 Apr. 28, 2005

(30) Foreign Application Priority Data

Aug. 30, 2003 (DE) ................................ 103 40 122

(51) Int. Cl.
*B01D 45/12* (2006.01)

(52) U.S. Cl. ............................ 95/269; 55/396; 55/416; 55/456; 55/457

(58) Field of Classification Search .................. 55/410, 55/413, 421, 423, 426, 355, 356, 348, 392, 55/394, 396, 397, 399, 447, 449, 450, 456, 55/457, DIG. 17, 416; 96/155, 188, 189, 96/191, 204, 206, 208, 214, 216; 95/267, 95/269, 270
See application file for complete search history.

(56) References Cited

U.S. PATENT DOCUMENTS 1,746,218 A 2/1930 Kamrath
2,506,298 A * 5/1950 Griffen ........................ 55/416
2,667,944 A * 2/1954 Crites .......................... 55/422
2,921,646 A * 1/1960 Poole .......................... 55/416
3,064,411 A 11/1962 Breslove, Jr.
3,670,479 A 6/1972 Tomlinson
3,713,280 A * 1/1973 Keller et al. .................. 55/360
4,089,665 A * 5/1978 Brookman ................... 55/457
4,289,611 A * 9/1981 Brockmann ................. 209/710
4,322,233 A * 3/1982 Sisk ............................ 55/426
4,390,426 A * 6/1983 Vicard ........................ 210/243
4,394,145 A * 7/1983 Sundseth ..................... 55/347
6,620,217 B2 * 9/2003 Bruckmann et al. .......... 55/347
6,966,940 B2 * 11/2005 Krisko et al. ................. 55/497

FOREIGN PATENT DOCUMENTS

DE 1301647 8/1969
EP 210910 2/1987
FR 1069071 7/1954
GB 1122684 8/1968

* cited by examiner

*Primary Examiner*—Duane Smith
*Assistant Examiner*—Robert Clemente
(74) *Attorney, Agent, or Firm*—Crowell & Moring LLP

(57) ABSTRACT

A separating apparatus which enables particles to be separated from a flowing medium by a preliminary separator which avoids the undesirably high pressure losses due to the flow resistance of known preliminary separators. The separating apparatus has a housing with an inlet and an outlet, in which a flow of air at the inlet end is caused to rotate by an inlet guide device, and is redirected again at the outlet end by an outlet guide device into a linear flow. The pressure recovery is achieved by a defined curvature and arrangement of the guide elements. The guide element curvature has an inlet contour, a retarding contour and a stabilizing contour. Preliminary separators of this type are used primarily in the air intake tracts of internal combustion engines exposed to heavy contamination, such as engines in farm machinery or construction machinery.

12 Claims, 1 Drawing Sheet

APPARATUS FOR SEPARATING PARTICLES FROM A FLOWING MEDIUM

BACKGROUND OF THE INVENTION

The invention relates to an apparatus and method for separating solid particles and liquids from flowing gases.

Separators of this type are used predominantly in the intake air of internal combustion engines if increased contamination and/or the presence of liquid droplets are generally expected as, for example, in engines for farm machinery and construction machinery of all types, as well as in commercial vehicles. Usually, these devices are used as preliminary separators.

U.S. Pat. No. 3,064,411 discloses an apparatus which is intended to separate solids from a fluid medium and has the following characteristics. The cylindrical housing of the device tapers conically at its axial end faces, and the inlet and the outlet are disposed at the reduced diameters. An inlet guide vane is arranged on the inlet side and an outlet guide vane at the outlet side within the cylinder, which is tapered conically at both ends. Both guide devices are provided circumferentially at the respective ends of the cylinder and guide the flowing media through curved guide vanes into a rotational movement. In their axial spacing, the guide vanes are connected with one another by a centrally disposed cylindrical core of reduced diameter. The transition of the diameters between guide vanes and core at both ends is formed by a conical section. A reducing sleeve, which transitions into a cylindrical pipe, is mounted following the inlet guide device. This reducing sleeve constricts the cross-section of the rotating, flowing medium and accordingly leads to an acceleration, which results in an optimum deposition. The reducing sleeve ends centrally in the cylindrical housing, so that the rotating flow continues its path through a circumferentially enlarged space. Before it reaches the outlet guide device, the flowing air is received by an annular separating element, which once again has a reduced cross section, and passed through a conical element to the outlet guide device. In the center of the housing, a funnel-shaped discharge opening is provided, which guides the particles to a discharge pipe.

The incoming air flow is passed over the conical surface to the guide vanes and caused to rotate. Due to the subsequent constriction, the rotation is accelerated, and the centrifugal force accordingly is increased. Since the diameter increases once again in the direction of flow after the reducing sleeve, the particles are deposited against the outer wall of the housing. Since the rotating flow of air passes through only a portion of the separation chamber, a second, lesser rotational movement arises adjacent the surface of the housing. Due to the different flows, the precipitated particles can pass through the low-lying funnel leading to the discharge opening without being carried along by the main flow of air. The medium flows on over the conical casing surface to the outlet guide device, which converts it back to a linear flow as a result of the opposite direction of rotation of the guide elements.

A disadvantageous aspect of this apparatus is its high manufacturing cost, which is necessary due to the arrangement of the individual air-guiding elements. Furthermore, a high flow resistance is produced by the four-fold change in cross-section of the main flow.

SUMMARY OF THE INVENTION

It is an object of the present invention to provide an improved apparatus for separating solid particles and/or liquid droplets from a gas stream.

Another object of the invention is to provide an apparatus for separating particles and/or liquid droplets from a gas stream which achieves a high degree of separation with a low pressure loss.

A further object of the invention is to provide an apparatus for separating particles and/or liquid droplets from a gas stream which can be manufactured simply and relatively inexpensively.

These and other objects are achieved in accordance with the present invention by providing an apparatus for separating entrained particles from a gas flow comprising a housing having an inlet at one end and an outlet at an opposite end; an inlet guide device adjacent the inlet for causing the gas flow to rotate helically; an outlet guide device adjacent the outlet, and a separating zone between the inlet guide device and the outlet guide device; wherein the outlet guide device comprises a central core and a plurality of guide elements extending outward from the core toward the housing, and the guide elements comprise an angled inlet section matching the helical flow angle of the gas flow; a curved rotation-retarding section for redirecting the gas flow to a linear flow, and a straight discharge section.

In accordance with a further aspect of the invention, the objects are achieved by providing a method of separating entrained particles from a gas stream comprising introducing the gas stream into a separator comprising an inlet guide device, a separation zone and an outlet guide device; passing the gas stream through the inlet guide device to cause the gas stream to rotate helically; separating particles from the rotating gas stream in the separating zone due to centrifugal force; and passing the gas stream through the outlet guide device to redirect the gas stream to a linear flow; wherein the outlet guide device comprises guide elements which comprise an inlet section which receives the helically rotating gas stream at an angle corresponding to its helical flow angle, a curved rotation-retarding section which redirects the gas stream to a linear flow, and a straight discharge section which stabilizes the linear flow of the gas stream.

The separating apparatus of the invention comprises a hollow, preferably cylindrical housing on which an inlet and an outlet are arranged. An inlet guide device, which causes the flowing medium to rotate, is arranged at the inlet. The flowing medium may be air or a gas stream which is contaminated with liquid and/or solid particles. The inlet guide device preferably is formed by a flat disk, which has a circumferential contour or an annular collar, which corresponds to the flow cross section of the housing and is fastened in the inlet region of the housing. Guide elements disposed on the inlet guide device, extend at an angle or in a curvature relative to the overall direction of gas flow. The guide elements are thereby preferably disposed at an annular ring-shaped end face of the guide device. It is also possible to extend the guide elements over the whole diameter of the guide device or to arrange them on the radially outer surface of the guide device. The guide elements thereby extend either curved or at an angle into the inner region of the housing. In the following separating zone, the particles and liquid droplets, separated by centrifugal force from the flowing air, are flung against the inner wall of the housing. The separated particles may be solid or liquid and move downward under the action of gravity.

At the outlet end, an outlet guide device is arranged, which receives the rotating flow of air in a controlled manner as a result of the curvature of the its guide elements matching the helical flow angle of the gas stream, retards the rotation of the gas stream in a controlled manner, and converts it into a linear flow. If the outlet guide device overlaps axially into the separating zone, then there must be an annular radial gap over at least a partial axial region between the outlet guide device and the housing, which enables the separated particles to be deposited against the housing. The outlet guide device may be manufactured in one piece with the housing or attached to the housing by welding, screws, adhesive bonding or some other type of connection known in the art. Preferably, the guide elements are supported over an axial length by a cylindrical core, which forms an ideal supporting contour.

The rotation of the flowing air advantageously is redirected into a linear motion by the curvature of the guide elements whose initial orientation is intentionally matched to the angle of rotation of the air flow. As a result, the pressure loss of the separator is minimized by up to about 60%. This makes it possible to minimize the pressure loss at a given separation efficiency by up to about 60%, or alternatively it is possible at a given pressure level to substantially increase the separation efficiency of the apparatus.

In one advantageous embodiment of the invention, a circumferential divider or separating element is arranged in a lower region of the separating zone spaced radially between the guide elements and the housing wall. This separating element advantageously serves to prevent separated particles from being entrained once again by the gas flow and carried off through the gas outlet with the gas stream.

In accordance with a further advantageous embodiment of the invention, a collection chamber is provided for collecting separated particles. The annular gap, which is formed between the outlet guide elements and the housing and is bounded by the aforementioned divider or separating element, can be closed off by an annular ring extending between the housing and the separating element. In this way a collection chamber is formed at the lower end of the separating zone. The uncontrolled release of dirt particles from the housing is advantageously prevented by the collection chamber, and a controlled discharge of the separated particles may be achieved. A controlled discharge is made possible, for example, by attaching a discharge pipe, which can discharge the particles to any lower position.

In a further, advantageous embodiment of the invention, the guide elements of the outlet guide device in a partial region extend axially beyond the divider or separating element counter to the direction of gas flow. The radially outer edges of the guide elements are in contact with the divider or separating element or are connected thereto. The axial ends of the guide elements extend beyond the separating element counter to the direction of flow. If there is no divider or separating element, a like result can also be achieved if, over an axial region, the guide elements form a radial annular gap with the housing. As a result of these configurations, the air stream can flow axially and radially into the guide elements through a partial region of the outlet guide device. In this way, the flow resistance can be advantageously decreased, or the flow volume can be increased while maintaining the same flow resistance.

An advantageous manufacturing advantage is achieved if the connection between the core and the housing or between the divider or separating element and the housing is formed solely by the guide vanes. The guide elements may be produced in one piece with the core, the housing or the separating element and affixed to the respective opposite member by gluing, welding, forming a fitted connection or via snap-connectors. In this way, the attachment between the core and the housing is secured by the guide elements and no additional components are required for mounting the core, so that, advantageously, less material is required and there are no additional holding elements, which would increase the flow resistance.

In a further advantageous embodiment of the invention, the upstream end of the core of the outlet guide device has a rounded or spherical construction, so that an advantageous reduction in the flow resistance is achieved.

In accordance with yet another advantageous embodiment of the invention, the downstream end of the core has a tapered or conical configuration. The conical termination advantageously acts as a diffuser and thereby increases the pressure recovery, as a result of which the flow resistance is reduced.

A further manufacturing advantage is achieved by configuring the overall housing and one guide device without any undercuts, so that only the oppositely directed second guide device needs to be subsequently attached. Due to the absence of undercuts, the housing and one guide device can be produced together in one piece by an original forming process, especially by injection molding from a polymer or from a light metal. The advantage of this configuration is that it makes it possible to use very economical production methods as well as integrating different functional elements in a single, one-piece component.

For optimal adaptation of the apparatus, it is advantageous if the ratio of the diameter of the core of the outlet guide device to the diameter of the housing is from 0.4 to 0.8. The smallest possible pressure loss is achieved with ratios in this range.

In a further advantageous embodiment of the invention, recesses are provided at the inlet end of the housing to facilitate attachment of the inlet guide device. These recesses enable the inlet guide device to be readily attached by clips, screws, rivets, adhesive bonding or welding. By these means the inlet guide device can be quickly and easily attached.

The method of the invention makes it possible to separate solid particles and/or liquid droplets from a flowing gas using a centrifugal separator with a minimum loss of pressure. In this method, the gas flowing through the inlet is caused to rotate by an inlet guide device. The rotating gas stream flows through a separating zone in which the particles are flung against the wall of the housing by centrifugal force. In the further course of the flow, the rotating gas stream moves through an outlet guide device, which causes the gas stream to flow in a straight line once again. The guide elements of the outlet guide device vane receive the helically flowing gas at an angle matching the helical flow angle and, due to their curvature, redirect the helical movement into a linear movement and stabilize the linear air flow. By these means, the rotational energy of the helical air flow is converted into a linear movement, and the pressure difference or pressure loss is thereby minimized.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
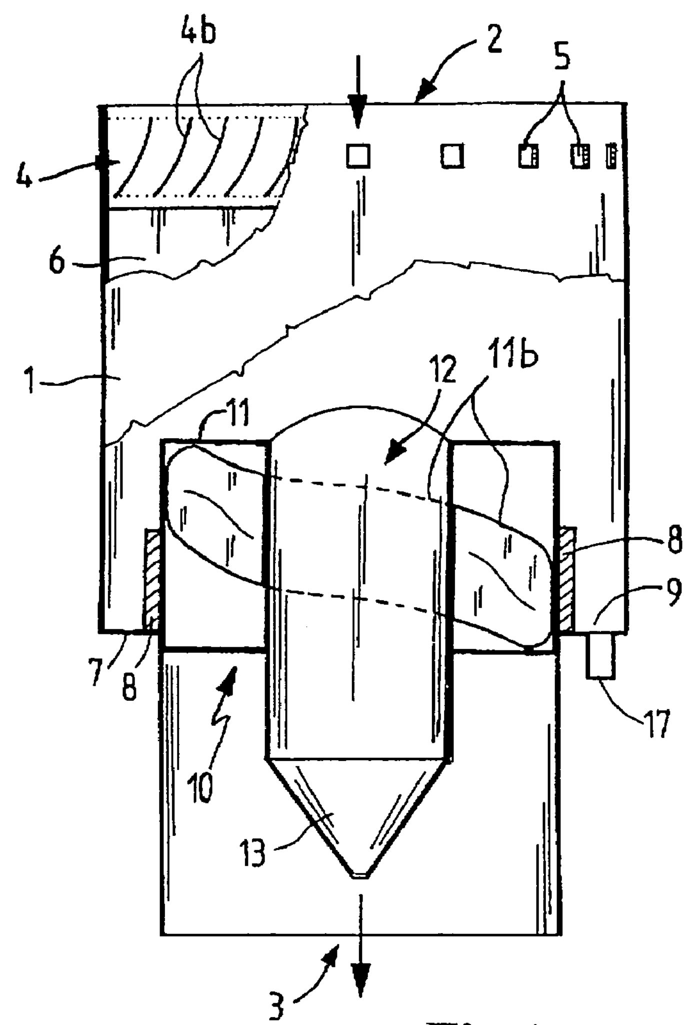
FIG. 1 is a partial sectional view of a separator with inlet and outlet guide devices.

FIG. 1 shows a preferably hollow cylindrical housing 1 provided with an inlet 2 and an outlet 3. Furthermore, an inlet guide device 4 is clipped into recesses 5 in the housing 1. Separated particles are deposited at the housing wall in a separating zone 6. The separated particles are collected on a collecting base 7, which is disposed beneath the separating zone 6. A divider or separating element 8 prevents the separated particles from being re-entrained by the flowing air and, together with the collecting base 7, forms a collecting chamber 9. A discharge pipe 17 is arranged in the collecting base 7 and forms a connection for controlled discharge of the separated particles. An outlet guide device 10 comprises guide elements 11 and a cylindrical core 12. Outlet guide 10 is manufactured in one piece with the divider 8, the collecting base 7 and the housing 1.

In the drawing, the external contour of the guide elements 11 has a rectangular cross-section. The helical lines 11*b* shown indicate the direction of rotation, which is opposite to that of the inlet guide vane 4. The one-piece connection between the outlet guide device 10 and the housing 1 may alternatively also be produced by adhesive bonding, welding or through the use of snap fasteners. The upstream end of the core 12 has a spherical or rounded configuration, and the downstream end has a tapered or conical configuration 13, so that the flow resistance of the core cross-section is minimized. The outlet cone 13 is attached to the core 12, for example, by gluing or by clips or a snap-on connection, as a result of which the tool core can be turned out. The housing 1, outlet guide device 10, core 12, collection base 7, divider 8 and discharge pipe 17 can be manufactured in one piece. The guide elements 11 of the outlet guide device 10 extend axially beyond the divider counter to the direction of gas flow and thereby minimize the flow resistance.

The incoming air flow is caused to rotate by the guide elements 4*b* of the inlet guide device 4. The rotating air flows through the separating zone 6, and as a result of centrifugal force, particles contained in the flowing air are thrown radially outwardly against the wall of the separating zone 6. The separated particles are removed from the collection chamber 9 in a controlled manner through the discharge pipe 17. Alternatively, if the apparatus is not provided with a collecting base 7, the separated particles can fall freely out of the separating zone 6 through the resulting gap between the divider and the wall of housing 1.

The rotating air stream is received axially and in a partial section also radially by the guide elements 11 of the outlet guide device 10 at an angle corresponding to its helical flow angle, and the rotation of the air stream is retarded in a controlled manner and converted into a linear flow by the curvature of the guide elements 11. Due to the controlled diversion of the air flow achieved by the outlet guide device 10, the kinetic energy of the rotating air stream is redirected by the guide elements 11 into a laminar, linear motion. The matching of the initial angle of the guide elements 11 of the outlet guide device 10 to the helical flow angle of the rotating air flow and the ongoing alignment of the guide elements 11 avoid the generation of turbulent flow and thereby minimize the resistance of air friction.

Figure 2:
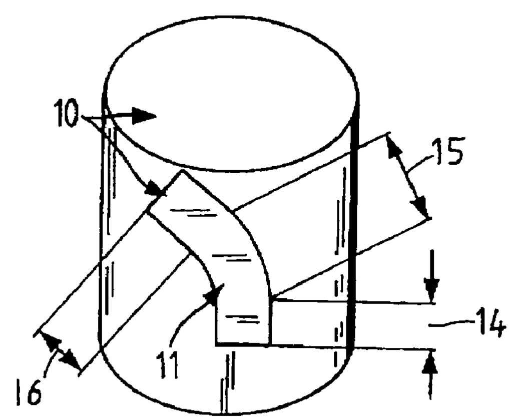
FIG. 2 is a depiction of the curvature of a guide element of an outlet guide device according to the invention.

FIG. 2 shows a perspective representation of the course of curvature of a guide element 11 of the outlet guide device 10 of FIG. 1, which is arranged on a cylindrical core. Parts which correspond to those shown in FIG. 1 are identified by the same reference numerals. The guide element 11 is constructed in the form of a strip and is disposed perpendicular to the circumferential surface of the core 12. Thus, in the installed state, the guide elements 11 form a flow channel between the components, which are depicted in FIG. 1 as the core 12 and the housing 1. The direction of flow of the channel is determined by the contours of the guide elements. The angle between the inlet contour 16 and the axis of the cylindrical core 12 corresponds to the angle of rotation of the flowing air. The rotating air enters the outlet guide device flowing parallel to the surfaces of the inlet contour 10 and, in the further course of flow, is diverted by the rotation retarding contour 15 so that it flows parallel to the axis of the cylinder. The surface of the discharge contour 14 guides the flowing air parallel to the axis of the cylinder, so that the linear air flow is stabilized. The successive inlet section 16, curved rotation retarding section 15 and straight discharge section 14 of guide elements 11 transition smoothly into one another in the direction of flow of the gas stream.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An apparatus for separating entrained particles from a gas flow, said apparatus comprising a housing having an inlet at one end and an outlet at an opposite end; an inlet guide device adjacent to the inlet for causing the gas flow to rotate helically, the inlet guide device being attached to the housing via recesses in the housing adjacent to the inlet; an outlet guide device adjacent to the outlet, and a separating zone between the inlet guide device and said outlet guide device; wherein the outlet guide device comprises a central core and a plurality of guide elements extending outward from the core toward the housing, and the guide elements comprise an angled inlet section matching a helical flow angle of the gas flow; a curved rotation-retarding section for redirecting the gas flow to a linear flow, and a straight discharge section; wherein the angled inlet section forms an angle with the axis of the central core which corresponds to the helical flow angle of the gas flow.

2. An apparatus according to claim 1, further comprising an annular divider adjacent the separating zone, said divider forming a collection chamber for collecting separated particles.

3. An apparatus according to claim 2, further comprising an annular member which closes a radial gap between the divider and the housing to form a closed collecting chamber.

4. An apparatus according to claim 2, wherein the guide elements of the outlet guide device extend axially beyond the divider counter to the direction of gas flow through the apparatus.

5. An apparatus according to claim 1, wherein the guide elements of the outlet guide device connect the core to the housing.

6. An apparatus according to claim 1, wherein the end of the core oriented toward the inlet has a rounded or spherical configuration.

7. An apparatus according to claim 1, wherein the end of the core oriented toward the outlet has a tapered or conical configuration.

8. An apparatus according to claim 1, wherein the housing and the outlet guide device are constructed together in one piece free of undercuts.

9. An apparatus according to claim 1, wherein the core and the housing have a diameter ratio in the range from 0.4 to 0.8.

10. An apparatus according to claim 1, wherein the inlet guide device is disposed entirely inside the inlet.

11. An apparatus according to claim 1, wherein the recesses are disposed around the periphery of the housing.

12. A method of separating entrained particles from a gas stream, said method comprising:

introducing the gas stream into a separator comprising an inlet guide device, a separation zone, an outlet guide device and recesses adjacent to the inlet guide device for attaching the inlet guide device to the separator;

passing the gas stream through the inlet guide device to cause the gas stream to rotate helically;

separating particles from the rotating gas stream in the separating zone due to centrifugal force; and passing the gas stream through the outlet guide device to redirect the gas stream to a linear flow;

wherein the outlet guide device comprises guide elements which comprise an inlet section which receives the helically rotating gas stream at an angle corresponding to its helical flow angle, a curved rotation-retarding section which redirects the gas stream to a linear flow, and a straight discharge section which stabilizes the linear flow of the gas stream;

wherein the inlet section forms an angle with the axis of the outlet guide device which corresponds to the helical flow angle of the gas stream.

* * * * *